US009729616B2

(12) United States Patent
Mahadevan et al.

(10) Patent No.: US 9,729,616 B2
(45) Date of Patent: Aug. 8, 2017

(54) REPUTATION-BASED STRATEGY FOR FORWARDING AND RESPONDING TO INTERESTS OVER A CONTENT CENTRIC NETWORK

(71) Applicant: CISCO TECHNOLOGY, INC., San Jose, CA (US)

(72) Inventors: Priya Mahadevan, Sunnyvale, CA (US); Glenn C. Scott, Los Altos, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 275 days.

(21) Appl. No.: 14/335,806

(22) Filed: Jul. 18, 2014

(65) Prior Publication Data

US 2016/0021172 A1  Jan. 21, 2016

(51) Int. Cl.
*G06F 15/173* (2006.01)
*H04L 29/08* (2006.01)
(Continued)

(52) U.S. Cl.
CPC ........ *H04L 67/10* (2013.01); *G06F 17/30598* (2013.01); *G06F 17/30876* (2013.01);
(Continued)

(58) Field of Classification Search
CPC . H04L 67/10; G06F 17/30598; G06F 7/30876
(Continued)

(56) References Cited

U.S. PATENT DOCUMENTS 817,441 A    4/1906  Niesz
4,309,569 A  1/1982  Merkle
(Continued)

FOREIGN PATENT DOCUMENTS

CN    103873371       6/2014
DE      1720277 A1    6/1967
(Continued)

OTHER PUBLICATIONS

Jacobson, Van et al. 'VoCCN: Voice Over Content-Centric Networks.' Dec. 1, 2009. ACM ReArch'09.
(Continued)

*Primary Examiner* — David Lazaro
*Assistant Examiner* — Marie Georges Henry
(74) *Attorney, Agent, or Firm* — Patent Capital Group

(57) ABSTRACT

A CCN network node use reputation values for one or more interfaces to determine how to forward an Interest. During operation, the network node can receive an Interest or Content Object via a network interface, determines one or more candidate outbound faces for forwarding the Interest by performing a longest-prefix-matching lookup in a forwarding information base (FIB) using the Interest's name or name prefix as input. A respective FIB entry maps a name prefix to a forwarding rule that includes a corresponding outbound face for the name prefix. The node can determine a reputation value for each of the candidate outbound faces based on reputation information stored in association with the Interest's name or name prefix, and selects a candidate outbound face with a reputation value exceeding a first predetermined threshold. The node can then forward the received Interest via the selected outbound face.

26 Claims, 9 Drawing Sheets

(51) Int. Cl.
  *G06F 17/30* (2006.01)
  *H04L 29/06* (2006.01)
(52) U.S. Cl.
  CPC ........ *H04L 65/403* (2013.01); *H04L 67/2842* (2013.01); *H04L 67/327* (2013.01)
(58) Field of Classification Search
  USPC .................................................. 709/204, 238
  See application file for complete search history.

(56) References Cited

U.S. PATENT DOCUMENTS

| | | |
|---|---|---|
| 4,921,898 A | 5/1990 | Lenney |
| 5,070,134 A | 12/1991 | Oyamada |
| 5,110,856 A | 5/1992 | Oyamada |
| 5,214,702 A | 5/1993 | Fischer |
| 5,377,354 A | 12/1994 | Scannell |
| 5,506,844 A | 4/1996 | Rao |
| 5,629,370 A | 5/1997 | Freidzon |
| 5,845,207 A | 12/1998 | Amin |
| 5,870,605 A | 2/1999 | Bracho |
| 6,047,331 A | 4/2000 | Medard |
| 6,052,683 A | 4/2000 | Irwin |
| 6,085,320 A | 7/2000 | Kaliski, Jr. |
| 6,091,724 A | 7/2000 | Chandra |
| 6,128,623 A | 10/2000 | Mattis |
| 6,128,627 A | 10/2000 | Mattis |
| 6,173,364 B1 | 1/2001 | Zenchelsky |
| 6,209,003 B1 | 3/2001 | Mattis |
| 6,226,618 B1 | 5/2001 | Downs |
| 6,233,617 B1 | 5/2001 | Rothwein |
| 6,233,646 B1 | 5/2001 | Hahm |
| 6,289,358 B1 | 9/2001 | Mattis |
| 6,292,880 B1 | 9/2001 | Mattis |
| 6,332,158 B1 | 12/2001 | Risley |
| 6,363,067 B1 | 3/2002 | Chung |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,862,280 B1 | 3/2005 | Bertagna |
| 6,901,452 B1 | 5/2005 | Bertagna |
| 6,915,307 B1 | 7/2005 | Mattis |
| 6,917,985 B2 | 7/2005 | Madruga |
| 6,957,228 B1 | 10/2005 | Graser |
| 6,968,393 B1 | 11/2005 | Chen |
| 6,981,029 B1 | 12/2005 | Menditto |
| 7,007,024 B2 | 2/2006 | Zelenka |
| 7,013,389 B1 | 3/2006 | Srivastava |
| 7,031,308 B2 | 4/2006 | Garcia-Luna-Aceves |
| 7,043,637 B2 | 5/2006 | Bolosky |
| 7,061,877 B1 | 6/2006 | Gummalla |
| 7,080,073 B1 | 7/2006 | Jiang |
| RE39,360 E | 10/2006 | Aziz |
| 7,149,750 B2 | 12/2006 | Chadwick |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,636,767 B2 | 12/2009 | Lev-Ran |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,069 B2 | 9/2010 | Cheung |
| 7,801,177 B2 | 9/2010 | Luss |
| 7,816,441 B2 | 10/2010 | Elizalde |
| 7,831,733 B2 | 11/2010 | Sultan |
| 7,873,619 B1 | 1/2011 | Faibish |
| 7,895,154 B2 * | 2/2011 | Newman ............... G06Q 10/107 707/609 |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devireddy |
| 7,979,912 B1 | 7/2011 | Roka |
| 8,000,267 B2 | 8/2011 | Solis |
| 8,010,691 B2 | 8/2011 | Kollmansberger |
| 8,069,023 B1 | 11/2011 | Frailong |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,271,687 B2 | 9/2012 | Turner |
| 8,312,064 B1 | 11/2012 | Gauvin |
| 8,332,357 B1 | 12/2012 | Chung |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 * | 6/2014 | Qian ............................ 709/241 |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,868,779 B2 | 10/2014 | ONeill |
| 8,874,842 B1 | 10/2014 | Kimmel |

(56) References Cited

U.S. PATENT DOCUMENTS

| | | |
|---|---|---|
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,002,921 B2 | 4/2015 | Westphal |
| 9,032,095 B1 | 5/2015 | Traina |
| 9,071,498 B2 | 6/2015 | Beser |
| 9,112,895 B1 | 8/2015 | Lin |
| 9,137,152 B2 | 9/2015 | Xie |
| 9,253,087 B2 | 2/2016 | Zhang |
| 9,270,598 B1 | 2/2016 | Oran |
| 9,280,610 B2 | 3/2016 | Gruber |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Peterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0218548 A1 | 11/2004 | Kennedy |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082662 A1* | 4/2008 | Dandliker ............... H04L 63/10 709/225 |
| 2008/0095159 A1 | 4/2008 | Suzuki |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0291923 A1 | 11/2008 | Back |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |

(56) References Cited

U.S. PATENT DOCUMENTS

| | | |
|---|---|---|
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185568 A1* | 7/2009 | Cho .................. H04L 47/10 370/395.31 |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz |
| 2012/0047361 A1 | 2/2012 | Erdmann |
| 2012/0066727 A1 | 3/2012 | Nozoe |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0300669 A1 | 11/2012 | Zahavi |
| 2012/0307629 A1 | 12/2012 | Vasseur |
| 2012/0314580 A1 | 12/2012 | Hong |
| 2012/0317307 A1 | 12/2012 | Ravindran |
| 2012/0322422 A1 | 12/2012 | Frecks |
| 2012/0323933 A1 | 12/2012 | He |
| 2012/0331112 A1 | 12/2012 | Chatani |

(56) References Cited

U.S. PATENT DOCUMENTS

| | | |
|---|---|---|
| 2013/0024560 A1 | 1/2013 | Vasseur |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0073882 A1 | 3/2013 | Inbaraj |
| 2013/0074155 A1 | 3/2013 | Huh |
| 2013/0090942 A1 | 4/2013 | Robinson |
| 2013/0091539 A1 | 4/2013 | Khurana |
| 2013/0110987 A1 | 5/2013 | Kim |
| 2013/0111063 A1 | 5/2013 | Lee |
| 2013/0128786 A1 | 5/2013 | Sultan |
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0262698 A1 | 10/2013 | Schwan |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0043987 A1 | 2/2014 | Watve |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0096249 A1 | 4/2014 | Dupont |
| 2014/0098685 A1 | 4/2014 | Shattil |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0181140 A1 | 6/2014 | Kim |
| 2014/0192677 A1 | 7/2014 | Chew |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0204945 A1 | 7/2014 | Byun |
| 2014/0214942 A1 | 7/2014 | Ozonat |
| 2014/0215156 A1* | 7/2014 | Park ............... G06F 12/0888 711/119 |
| 2014/0233575 A1* | 8/2014 | Xie ............... H04L 45/44 370/400 |
| 2014/0237085 A1 | 8/2014 | Park |
| 2014/0237095 A1 | 8/2014 | Bevilacqua-Linn |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0279348 A1 | 10/2015 | Cao |
| 2015/0288755 A1 | 10/2015 | Mosko |
| 2015/0312300 A1 | 10/2015 | Mosko |
| 2015/0349961 A1 | 12/2015 | Mosko |
| 2015/0372903 A1 | 12/2015 | Hui |
| 2015/0381546 A1 | 12/2015 | Mahadevan |
| 2016/0019275 A1 | 1/2016 | Mosko |
| 2016/0021172 A1 | 1/2016 | Mahadevan |
| 2016/0062840 A1 | 3/2016 | Scott |
| 2016/0110466 A1 | 4/2016 | Uzun |
| 2016/0171184 A1 | 6/2016 | Solis |

FOREIGN PATENT DOCUMENTS

| | | |
|---|---|---|
| DE | 19620817 A1 | 11/1997 |
| EP | 0295727 A2 | 12/1988 |
| EP | 0757065 A2 | 7/1996 |
| EP | 1077422 A2 | 2/2001 |
| EP | 1383265 A1 | 1/2004 |
| EP | 1384729 A1 | 1/2004 |
| EP | 1473889 A2 | 11/2004 |
| EP | 2120402 | 11/2009 |
| EP | 2120419 | 11/2009 |
| EP | 2120419 A2 | 11/2009 |
| EP | 2124415 A2 | 11/2009 |
| EP | 2214357 A1 | 8/2010 |

(56) References Cited

FOREIGN PATENT DOCUMENTS

| | | |
|---|---|---|
| EP | 2299754 A1 | 3/2011 |
| EP | 2323346 | 5/2011 |
| EP | 2552083 | 1/2013 |
| EP | 2214356 | 5/2016 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007122620 | 11/2007 |
| WO | 2007144388 A1 | 12/2007 |
| WO | 2011049890 A1 | 4/2011 |
| WO | 2012077073 A1 | 6/2012 |
| WO | 2013123410 | 8/2013 |
| WO | 2015084327 | 6/2015 |

OTHER PUBLICATIONS

Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Jacobson, Van et al., "Content-Centric Networking, Whitepaper Describing Future Assurable Global Networks", Palo Alto Research Center, Inc., Jan. 30, 2007, pp. 1-9.
Koponen, Teemu et al., "A Data-Oriented (and Beyond) Network Architecture", SIGCOMM '07, Aug. 27-31, 2007, Kyoto, Japan, XP-002579021, p. 181-192.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
B. Ahlgren et al., 'A Survey of Information-centric Networking' IEEE Commun. Magazine, Jul. 2012, pp. 26-36.
B. Lynn$2E.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C. Gentry and A. Silverberg. Hierarchical ID-Based Cryptography. Advances in Cryptology—ASIACRYPT 2002. Springer Berlin Heidelberg (2002).
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D. Boner, C. Gentry, and B. Waters, Collusi.
D. Boneh and M. Franklin. Identity-Based Encryption from the Weil Pairing. Advances in Cryptology—CRYPTO 2001, vol. 2139, Springer Berlin Heidelberg (2001).
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Ateniese, K. Fu, M. Green, and S. Hohenberger. Improved Proxy Reencryption Schemes with Applications to Secure Distributed Storage. In the 12th Annual Network and Distributed System Security Sympo.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.

(56) References Cited

OTHER PUBLICATIONS

G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.

G. Xylomenos et al., "A Survey of Information-centric Networking Research," IEEE Communication Surveys and Tutorials, Jul. 2013.

Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.

Garcia-Luna-Aceves, Jose J. 'A unified approach to loop-free routing using distance vectors or link states.' ACM SIGCOMM Computer Communication Review. vol. 19. No. 4. ACM, 1989.

Garcia-Luna-Aceves, Jose J. 'Name-Based Content Routing in Information Centric Networks Using Distance Information' Proc ACM ICN 2014, Sep. 2014.

Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.

Ghodsi, Ali, et al. "Information-centric networking: seeing the forest for the trees." Proceedings of the 10th ACM Workshop on Hot Topics in Networks. ACM, 2011.

Ghodsi, Ali, et al. "Naming in content-oriented architectures." Proceedings of the ACM SIGCOMM workshop on Information-centric networking. ACM, 2011.

Gupta, Anjali, Barbara Liskov, and Rodrigo Rodrigues. "Efficient Routing for Peerto-Peer Overlays." NSDI. vol. 4. 2004.

H. Xiong, X. Zhang, W. Zhu, and D. Yao. CloudSeal: End-to$2.

Heckerman, David, John S. Breese, and Koos Rommelse. "Decision-Theoretic Troubleshooting." Communications of the ACM. 1995.

Heinemeier, Kristin, et al. "Uncertainties in Achieving Energy Savings from HVAC Maintenance Measures in the Field." ASHRAE Transactions 118.Part 2 {2012).

Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).

Hoque et al., 'NLSR: Named-data Link State Routing Protocol', Aug. 12, 2013, ICN 2013, pp. 15-20.

https://code.google.com/p/ccnx-trace/.

I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.

Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.

J. Aumasson and D. Bernstein, "SipHash: a fast short-input PRF", Sep. 18, 2012.

J. Bethencourt, A, Sahai, and B. Waters, 'Ciphertext-policy attribute-based encryption,' in Proc. IEEE Security & Privacy 2007, Berkeley, CA, USA, May 2007, pp. 321-334.

J. Hur, "Improving security and efficiency in attribute-based data sharing," IEEE Trans. Knowledge Data Eng., vol. 25, No. 10, pp. 2271-2282, Oct. 2013.

J. Shao and Z. Cao. CCA-Secure Proxy Re-Encryption without Pairings. Public Key Cryptography. Springer Lecture Notes in Computer ScienceVolume 5443 (2009).

V. Jacobson et al., 'Networking Named Content,' Proc. IEEE CoNEXT '09, Dec. 2009.

Jacobson et al., "Custodian-Based Information Sharing," Jul. 2012, IEEE Communications Magazine: vol. 50 Issue 7 (p. 3843).

Ji, Kun, et al. "Prognostics enabled resilient control for model-based building automation systems." Proceedings of the 12th Conference of International Building Performance Simulation Association. 2011.

K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.

Katipamula, Srinivas, and Michael R. Brambley. "Review article: methods for fault detection, diagnostics, and prognostics for building systemsa review, Part I." HVAC&R Research 11.1 (2005): 3-25.

Katipamula, Srinivas, and Michael R. Brambley. "Review article: methods for fault detection, diagnostics, and prognostics for building systemsa review, Part II." HVAC&R Research 11.2 (2005): 169-187.

L. Wang et al., 'OSPFN: An OSPF Based Routing Protocol for Named Data Networking,' Technical Report NDN-0003, 2012.

L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.

Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.

Lopez, Javier, et al. "Trust management systems for wireless sensor networks: Best practices." Computer Communications 33.9 (2010): 1086-1093.

M. Blaze, G. Bleumer, and M. Strauss, 'Divertible protocols and atomic prosy cryptography,' in Proc. EUROCRYPT 1998, Espoo, Finland, May-Jun. 1998, pp. 127-144.

M. Green and G. Ateniese, "Identity-based proxy re-encryption," in Proc. ACNS 2007, Zhuhai, China, Jun. 2007, pp. 288-306.

M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.

M. Naor and B. Pinkas "Efficient trace and revoke schemes," in Proc. FC 2000, Anguilla, British West Indies, Feb. 2000, pp. 1-20.

M. Nystrom, S. Parkinson, A. Rusch, and M. Scott, "PKCS#12: Personal information exchange syntax v. 1.1," IETF RFC 7292, K. Moriarty, Ed., Jul. 2014.

M. Parsa and J.J. Garcia-Luna-Aceves, "A Protocol for Scalable Loop-free Multicast Routing." IEEE JSAC, Apr. 1997.

M. Walfish, H. Balakrishnan, and S. Shenker, "Untangling the web from DNS," in Proc. USENIX NSDI 2004, Oct. 2010, pp. 735-737.

Mahadevan, Priya, et al. "Orbis: rescaling degree correlations to generate annotated internet topologies." ACM SIGCOMM Computer Communication Review. vol. 37. No. 4. ACM, 2007.

Mahadevan, Priya, et al. "Systematic topology analysis and generation using degree correlations." ACM SIGCOMM Computer Communication Review. vol. 36. No. 4. ACM, 2006.

Matocha, Jeff, and Tracy Camp. 'A taxonomy of distributed termination detection algorithms.' Journal of Systems and Software 43.3 (1998): 207-221.

Matteo Varvello et al., "Caesar: A Content Router for High Speed Forwarding", ICN 2012, Second Edition on Information-Centric Networking, New York, Aug. 2012.

McWilliams, Jennifer A., and Iain S. Walker. "Home Energy Article: A Systems Approach to Retrofitting Residential HVAC Systems." Lawrence Berkeley National Laboratory (2005).

Merindol et al., "An efficient algorithm to enable path diversity in link state routing networks", Jan. 10, Computer Networks 55 (2011), pp. 1132-1140.

Mobility First Project [online], http://mobilityfirst.winlab.rutgers.edu/, Downloaded Mar. 9, 2015.

Narasimhan, Sriram, and Lee Brownston. "HyDE—A General Framework for Stochastic and Hybrid Modelbased Diagnosis." Proc. DX 7 (2007): 162-169.

NDN Project [online], http://www.named-data.net/, Downloaded Mar. 9, 2015.

Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.

(56) References Cited

OTHER PUBLICATIONS

P. Mahadevan, E.Uzun, S. Sevilla, and J. Garcia-Luna-Aceves, "CCN-krs: A key resolution service for ccn," in Proceedings of the 1st International Conference on Information-centric Networking, Ser. Inc 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/documents/Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Mini-conference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network$.
D. Trossen and G. Parisis, "Designing and realizing and information-centric internet," IEEE Communications Magazine, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.

(56) References Cited

OTHER PUBLICATIONS

J. Lotspiech, S. Nusser, and F. Pestoni. Anonymous Trust: Digital Rights Management using Broadcast Encryption. Proceedings of the IEEE 92.6 (2004).
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryptographic Cloud Storage. Financial Cryptography and Data Security. Springer Berlin Heidelberg (2010).
RTMP (2009). Available online at http://wwwimages.adobe.com/www.adobe.com/content/dam/Adobe/en/devnet/rtmp/ pdf/rtmp specification 1.0.pdf.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Xie et al. "Collaborative Forwarding and Caching in Content Centric Networks", Networking 2012.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).
Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.
Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.
Tiancheng Zhuang et al. "Managing Ad Hoc Networks of Smartphones", International Journal of Information and Education Technology, Oct. 1, 2013.
Amadeo et al. "Design and Analysis of a Transport-Level Solution for Content-Centric VANETs", University "Mediterranea" of Reggio Calabria, Jun. 15, 2013.
Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf *paragraphs [01.3], [002], [02.1], [0003].
Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, *Paragraph [002]* *figure 1*.
Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016] *paragraphs [003]-[006], [0011], [0013]* *figures 1,2*.
Marc Mosko et al "All-In-One Streams for Content Centric Networks", May 24, 2015, retrieved from the Internet: http://www.ccnx.org/pubs/AllinOne.pdf [downloaded Jun. 9, 2016].
Cesar Ghali et al. "Elements of Trust in Named-Data Networking", Feb. 13, 2014 Retrieved from the Internet Jun. 17, 2016 http://arxiv.org/pdf/1402.3332v5.pdf *p. 5, col. 1* *p. 2, col. 1-2* * Section 4.1; p. 4, col. 2* *Section 4.2; p. 4, col. 2*.
Priya Mahadevan et al. "CCN-KRS", Proceedings of the 1st International Conference on Information-Centric Networking, Inc. '14, Sep. 24, 2014.
Flavio Roberto Santos Et al. "Funnel: Choking Polluters in BitTorrent File Sharing Communities", IEEE Transactions on Network and Service Management, IEEE vol. 8, No. 4, Dec. 1, 2011.
Liu Wai-Xi et al: "Multisource Dissemination in content-centric networking", 2013 Fourth International conference on the network of the future (NOF), IEEE, Oct. 23, 2013, pp. 1-5.
Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.
Asokan et al.: "Server-Supported Signatures", Computer Security Esorics 96, Sep. 25, 1996, pp. 131-143, Section 3.
Mandl et al.: "A Fast FPGA Based Coprocessor Supporting Hard Real-Time Search", New Frontiers of Information Technology, Proceedings of the 23rd Euromicro Conference Budapest, Sep. 1, 1997, pp. 499-506.
Sun et al.: "Content-Based Route Lookup Using CAMs", Global Communications Conference, IEEE, Dec. 3, 2012.

* cited by examiner

FIB 700

| NAMESPACE/<br>NAME PREFIX 702 | REPUTATION VALUE 704 | FACE 706 |
|---|---|---|
| /bbc | 65% | C |
| /bbc | 60% | B |
| /bbc | 60% | A |
| /cnn | 60% | 0 |
| /netflix | 50% | D |

FIG. 7

CONTENT STORE 800

| CONTENT OBJECT<br>NAMESPACE 802 | FACE 806 | REPUTATION VALUE 804 |
|---|---|---|
| /bbc/headlines | B | 60% |
| /cnn/headlines | 0 | 60% |
| /netflix/video | D | 50% |

FIG. 8

REPUTATION-BASED STRATEGY FOR FORWARDING AND RESPONDING TO INTERESTS OVER A CONTENT CENTRIC NETWORK

FIELD

The present disclosure generally relates to a content centric network (CCN). More specifically, the present disclosure relates to a method and apparatus for using a reputation-based strategy to forward Interests and return Content Objects in a CCN.

RELATED ART

The proliferation of the Internet and e-commerce continues to fuel revolutionary changes in the network industry. Today, a significant number of information exchanges, from online movie streaming to daily news delivery, retail sales, and instant messaging, are conducted online. An increasing number of Internet applications are also becoming mobile. However, the current Internet operates on a largely location-based addressing scheme. The most ubiquitous protocol, the Internet Protocol (IP), is based on location-based address. That is, a consumer of content can only receive the content by explicitly requesting the content from an address (e.g., IP address) closely associated with a physical object or location. This restrictive addressing scheme is becoming progressively inadequate for meeting the ever-changing network demands.

Recently, content centric networking (CCN) architectures have been proposed in the industry. CCN brings a new approach to content transport. Instead of having network traffic viewed at the application level as end-to-end connections over which content travels, content is requested or returned based on its unique name, and the network is responsible for routing content from the provider to the consumer.

With content centric networks, a node in the network may receive a request for some content using the content name, which is called an Interest. If the node cannot provide the content to satisfy the Interest, it may forward the Interest through an interface associated with the Interest's name or name prefix, and the Interest eventually reaches a node that can provide a Content Object to satisfy the Interest.

However, current techniques for forwarding an Interest do not allow for forwarding strategies that may use network resources more efficiently. Network conditions may change and nodes are limited in their ability to adapt and respond to the changing conditions. For example, the response time for an interface may increase dramatically, but the node may continue to forward Interests to the interface, which is undesirable. As another example, the network may become congested at the same time every day, and certain interfaces may provide a greater bandwidth than others. To make matters worse, some interfaces may deliver content objects whose signatures do not have a high probability of being verified successfully. Current CCN nodes are not capable of selecting which interfaces to use for sending or receiving packets to maximizing their performance and/or to obtain content from the most reliable nodes/caches.

SUMMARY

One embodiment of the present invention provides a CCN network node that facilitates strategic use of reputation values to forward Interests and cache Content Objects.

During operation, the network node can determine one or more candidate outbound faces for forwarding an Interest by looking up the Interest's name or name prefix in a forwarding information base (FIB). A respective FIB entry maps a name prefix to a forwarding rule that includes a corresponding outbound face for the name prefix. The node can determine a reputation value for each of the candidate outbound faces based on reputation information stored in association with the Interest's name or name prefix, and selects a candidate outbound face with a reputation value exceeding a first predetermined threshold. The node can then forward the received Interest via the selected outbound face.

In one variation on this embodiment, the reputation information includes at least one of: a reputation value, a set of attribute values, and a set of attribute weights.

In one variation on this embodiment, the network node determines the reputation value by obtaining the reputation value from the reputation information, computing the reputation value based on one or more of the attribute values and attribute weights from the reputation information or computing the reputation value from one or more of the attribute values of the reputation information and custom attribute weights for the one or more attribute values.

In one variation on this embodiment, the node can receive, via one or more faces, one or more Content Objects associated with a common name or name prefix. The node determines, for each of the one or more Content Objects, reputation information for a respective face, or for the name or name prefix of the Content Object received via the respective face. The node then determines whether to cache a respective Content Object based on the corresponding reputation information. The node may cache the Content Object with the corresponding reputation information in a Content Store in response to determining to cache the respective Content Object.

In one variation on this embodiment, the node can forward the received Interest via multiple outbound faces. The node can wait for a predetermined period of time to receive one or more Content Objects via any of the multiple outbound faces, such that each of the one or more Content Objects is associated with reputation information. The node selects, from the one or more Content Objects, a second Content Object with a highest reputation value. The network node may cache the second Content Object and return the second Content Object via a face from which the Interest was received, in response to determining that the second Content Object's reputation value is higher than the reputation value of a cached Content Object.

In one variation on this embodiment, the network node can receive a second Interest from a first ingress face, and perform a lookup in a Content Store to retrieve a cached Content Object that satisfies the second Interest. The Content Store may store the Content Object along with corresponding reputation information. The network node can return the cached Content Object to the requesting node in response to determining, from the Content Object's reputation information, that the Content Object's reputation value exceeds a predetermined threshold.

In one variation on this embodiment, the network node can assign an attribute value to one or more attributes for a second candidate outbound face, and assigns a weight value to each of the one or more attributes. The node can compute a reputation value for the second candidate outbound face for the name prefix based on the assigned attribute value and the assigned weight value. The node may store reputation information, which includes the reputation values, attribute values, and weight values, in association with the candidate outbound face and/or the name prefix.

In one variation on this embodiment, the network node can compute one or more attribute values for a respective candidate outbound face based on the name prefix, and can normalize a respective attribute value based on a highest expected value for the attribute. The node can determine a weight for the respective attribute value, and computes the reputation value for the outbound face and name prefix as a weighted sum of the one or more attribute values.

In one variation on this embodiment, the network node can receive a first Interest from a first ingress face, and a second Interface from a second ingress face. The network node determines whether the second ingress face is associated with a higher priority than the first ingress face. If so, the network node forwards the first Interest via a first egress face, and forwards the second Interest via a second egress face with a reputation value that is higher than that of the first egress face.

In one variation on this embodiment, the network node can determine a set of name prefixes associated with the name prefix classification for a name prefix classification. The network node generates reputation information for the name prefix classification based on profiling information associated with the set of name prefixes, and associates the reputation information with the name prefix classification.

BRIEF DESCRIPTION OF THE FIGURES

FIG. 7 presents a block diagram illustrating an exemplary forwarding information base (FIB) with reputation values, according to an embodiment.

FIG. 8 presents a block diagram illustrating an exemplary Content Store, according to an embodiment.

In the figures, like reference numerals refer to the same figure elements.

DETAILED DESCRIPTION

Figure 1:
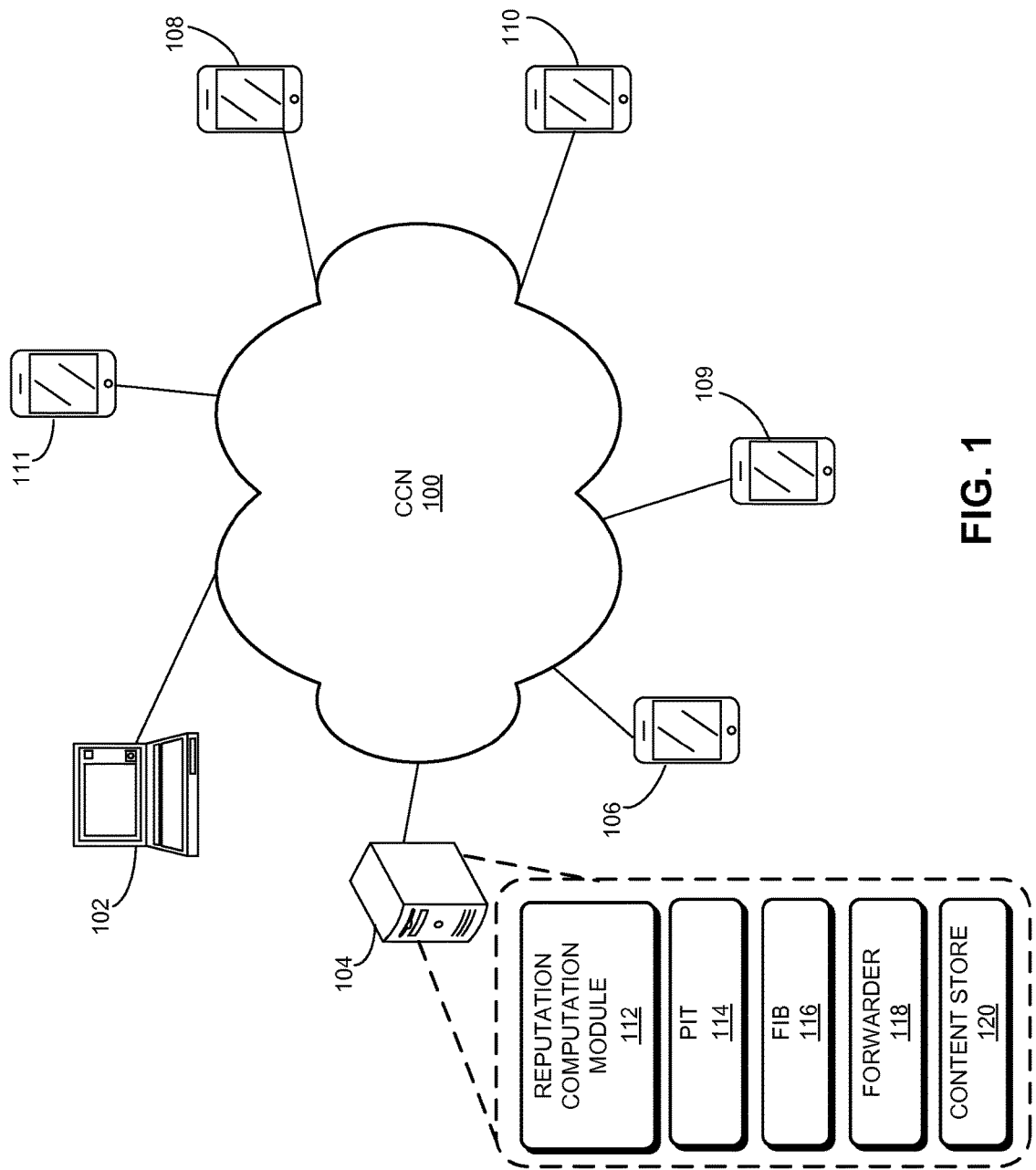
FIG. 1 presents a diagram illustrating an exemplary network environment that includes a CCN, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Overview

Embodiments of the present invention solve the problem of inflexible and inefficient utilization of network resources by using reputation values to dynamically adapt the forwarding of Interests and caching of Content Objects. This increases the likelihood of meeting specific objectives associated with name prefixes. A CCN node computes a reputation value as a numeric value using a customized calculation designed to weigh quantifiable factors that could assist the node to meet specific objectives. These factors can be quantified by numeric attributes such as the latency or bandwidth of an interface for a particular name prefix, or the success rate for verifying Content Object signatures for a particular name prefix coming from an interface. An attribute is a quantifiable property, policy, or characteristic that a node can measure to make an informed decision.

A system administrator can assign a weighted value to each attribute so that the computed reputation value achieves a desired objective. The objectives can include, for example, providing a continuous video-streaming experience to a user, or providing authentic data that has not been forged or tampered with. An objective is typically associated with a specific namespace, and different namespaces may be associated with different objectives. To achieve the objective, attributes specific to this objective can be used to compute a reputation value directed to this objective. Hence, a network node may assign weight values to an interface's attributes based on an Interest's name prefix, or based on an objective associated with the name prefix.

By introducing reputation values into the decision-making process at the CCN node, the node can greatly increase the probability of meeting various objectives for a namespace. The node has more fine-grained control and can make more informed decisions when utilizing reputation values. The node will more efficiently use network resources and significantly reduce the likelihood of content requesters receiving bad content or poor service.

The node may use a reputation value, for example, to make forwarding decisions, to decide whether to cache a Content Object, or to determine whether to return a Content Object read from a cache. The node may compute a reputation value for each face that it can use to forward an Interest, and forward an Interest to one or more faces with reputation values exceeding a predetermined minimum threshold. Note that the term "face" refers to an interface or a virtual interface, and a virtual interface can include a collection of interfaces. The node may also compute a reputation value for a Content Object received from a face, and then cache the Content Object in the Content Store if the reputation value exceeds a predetermined threshold. Furthermore, the node may return a Content Object from the Content Store to a requesting node if the reputation value associated with the cached Content Object exceeds a predetermined threshold.

In some embodiments, the node may compute a reputation value R which is a linear combination of weighted attribute values $<x_1, x_2, \ldots, x_n>$:

$$R = \sum_{i=1}^{n} w_i x_i$$

where n is the number of attributes, $x_i$ is the attribute value for attribute i, and $w_i$ is the weight value for attribute i. Attributes can cover a wide variety of topics. Attributes can include performance metrics such as latency or bandwidth measures for a face. Other examples of attributes include the number of times that a node has successfully verified signatures for Content Objects for a particular face, routing policies (e.g., restrictions on time of routing or type of network traffic), and a number of times the node received the same Interest. The node may associate different weight values with different attributes to emphasize the importance of certain attributes for a given objective associated with the name prefix, and to reduce the importance of other attributes. For a given name prefix, a node and/or an administrator may select and adjust the attributes and weight values over time to achieve an objective of the name prefix.

The node can automatically adapt to changing network conditions to meet objectives through proper selection and use of attributes and weight values in computing the reputation value. For example, by adding a latency attribute to a reputation value and heavily weighting the latency attribute, a node can forward Interests so that the face with the lowest latency will receive the Interest, even as the network load shifts among the faces.

Content-Centric Network Architecture

In a CCN, communication is driven by the consumers of data. The CCN architecture provides two packet types: an Interest packet and a Content Object (e.g., data) packet. An Interest packet (also called a "query") serves as a request for some content. An Interest packet encodes a special form of query that expresses the name (or sometimes name prefix) of the content that is desired. A Content Object packet includes a unit of content. Content Object packets are self-identifying by carrying within them their full name. A consumer asks for content by sending the Interest over the content centric network, and any recipient of the Interest can satisfy the Interest by responding with a matching Content Object. Content Objects are transmitted only in response to an Interest, and consumes that Interest. Both Interest and Content Objects identify the content being exchanged by the content name (or CCN name). In some embodiments, a Content Object can "satisfy" an Interest if the CCN name in the Interest packet is a prefix of the CCN name in the Content Object. The following terms describe elements of a content-centric network (CCN):

Content Object: A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Name: A name in a CCN is typically location independent and uniquely identifies a Content Object. A data-forwarding device can use the name or name prefix to forward an Interest packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document.

In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814 (entitled "ORDERED-ELEMENT NAMING FOR NAME-BASED PACKET FORWARDING," by inventor Ignacio Solis, filed 20 Mar. 2013), which is hereby incorporated by reference. A name can also be a flat label. Hereinafter, "name" is used to refer to any name for a piece of data in a named-data network, such as a hierarchical name or name prefix, a flat name, a fixed-length name, an arbitrary-length name, or a label (e.g., a Multiprotocol Label Switching (MPLS) label).

Interest: A packet that indicates a request for a piece of data, and includes a name (or a name prefix) for the piece of data. A data consumer can disseminate a request or Interest across an information-centric network, which CCN routers can propagate toward a storage device (e.g., a cache server) or a data producer that can provide the requested data to satisfy the request or Interest.

A description of a CCN architecture is described in U.S. patent application Ser. No. 12/338,175 (entitled "CONTROLLING THE SPREAD OF INTERESTS AND CONTENT IN A CONTENT CENTRIC NETWORK," by inventors Van L. Jacobson and Diana K. Smetters, filed 18 Dec. 2008), which is hereby incorporated by reference.

Exemplary Architecture of a CCN

FIG. 1 presents a diagram illustrating an exemplary network environment that includes a CCN 100, in accordance with an embodiment of the present invention. CCN 100 includes a number of devices, such as a laptop computer 102, a media server 104, and smartphones 106-111, coupled to each other via CCN 100. Note that the devices can be any type of a computing device, including mobile computing devices, such as a laptop computer, a tablet or slate computer, a smartphone, or a personal digital assistant (PDA), or a stationary computing device, such as a desktop computer or a home media server.

In addition, each device may have a reputation computation module, a pending interest table (PIT), a forwarding information base (FIB), and a forwarder, among other components. An example of the components is illustrated for media server 104, including a reputation computation module 112, a PIT 114, a FIB 116, a forwarder 118, and a Content Store 120.

Reputation computation module 112 can compute and update reputation values either periodically or on-demand (in near real-time). Node 104 maintains PIT 114 to keep track of pending Interests, and can update PIT 114 when it receives a new Interest or when a pending Interest is satisfied or times out. PIT 114 stores entries for Interests that are to be matched against incoming Content Objects, and each entry is only removed when a match is made, or when an Interest times out. FIB 116 is a forwarding table that contains information for node 104 to determine to which neighbor node or nodes an Interest should be sent.

Forwarder 118 forwards Interests and/or packets on the network. Forwarder 118 performs functions that include deciding to which faces it will forward an Interest based on reputation values, and updating reputation values and attribute values when a node receives an Interest or a Content Object. Note that in some embodiments, the media server 104 may include additional modules that perform some of the individual functions of forwarder 118, and embodiments of the present invention are not limited to the modules described herein.

Content Store 120 can cache Content Objects that media center 104 has received via one or more faces.

Exemplary CCN Topology

Figure 2:
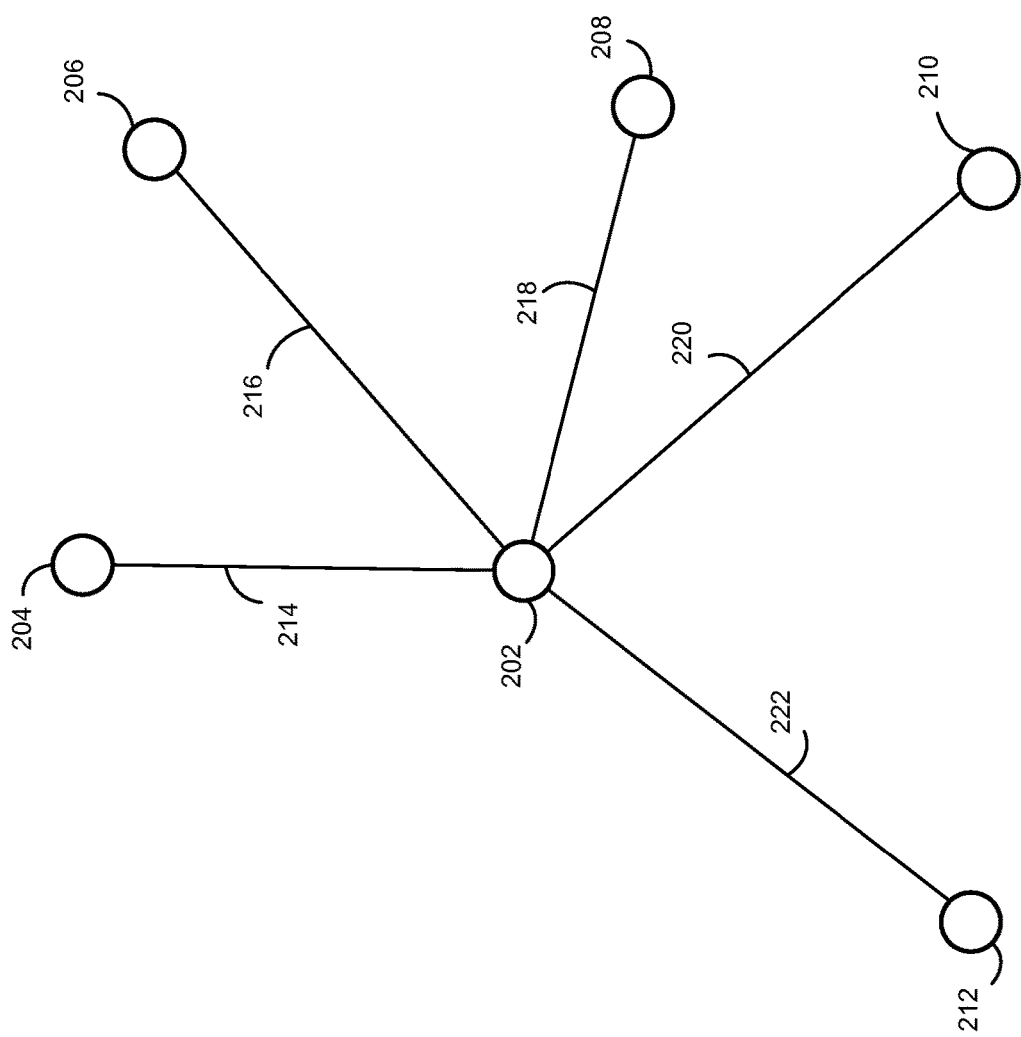
FIG. 2 presents an exemplary CCN topology that facilitates strategic use of reputation values to forward Interests and cache Content Objects, in accordance with an embodiment of the present invention.

FIG. 2 presents an exemplary CCN topology for a set of CCN nodes that use reputation values to forward Interests and cache Content Objects, in accordance with an embodiment of the present invention. FIG. 2 illustrates six example nodes 202-212 in a CCN, with five nodes 204-212 connected through faces 214-222 to node 202. Node 202 may include, for example, media server 104 in FIG. 1. Node 202 may receive an Interest through face 222, at which point node 202 decides whether to return a cached Content Object or forward the Interest.

If there is a Content Object that satisfies the Interest cached in Content Store 120 at node 202, node 202 may return the Content Object if a reputation value associated with the cached Content Object exceeds a predetermined threshold.

If node 202 determines that it is necessary to forward the Interest, node 202 may use reputation values of faces 214-220 to select faces for forwarding the Interest. Node 202 may send the Interest to a face with the highest reputation value or send the Interest to a selection of faces with reputation values above a predetermined threshold. Node 202 may also use reputation values to determine whether to cache any Content Object received from its neighboring nodes.

Node 202 can initially assign a set of attributes to a name prefix, or to a face for a particular name prefix. For example, node 202 can assign a set of attributes to name prefix "/bbc." The first attribute can correspond to the frequency that Content Objects containing the name prefix are requested, and the second attribute can correspond to special policies associated with the name prefix. Hence, computing a reputation value for the name prefix (e.g., without an associated face) can be useful in deciding whether to cache a content object.

In some embodiments, node 202 can compute a reputation value for an interface, for example, by collapsing reputation values associated with multiple name prefixes. Computing a reputation value for the interface (e.g., without an associated name prefix) can be useful in deciding how to forward an Interest with a rare name prefix. It may be difficult for the node to compute an accurate reputation for a name prefix for which historical performance data does not exist, hence the node can decide how to forward the Interest based on a face's general performance.

Node 202 can also assign a set of attributes to a face for a particular name prefix (e.g., "per name-prefix, per face"). For example, node 202 can assign a set of attributes to face 216 for name prefix "/bbc." These attributes can include a latency (e.g., response time in receiving a Content Object after sending an Interest via face 216), and a signature verification success rate. A Content Object includes a name, data, and a signature that binds the name and data to a producer of the data. This signature can confirm the authenticity and integrity of the data. Another attribute can correspond to a routing policy that can specify routing constraints or routing considerations, such as restrictions on routing between nodes during certain time periods or restrictions on the traffic load or types of traffic to some portions of the network.

An attribute can also involve a protocol for a particular type of traffic packet, such as video traffic packets. For example, node 202 may need to apply certain rules to video traffic packets, and may need to forward the packets to a particular face. Node 202 can map an attribute to a numeric value for computing the reputation value. For example, node 202 can map the routing policy attribute or protocol attribute to a numeric value.

Note that node 202 can compute a reputation value for a face with the particular name prefix. This is computing a reputation value "per name-prefix, per face." A different name prefix for the same face may be associated with different attributes, and thus a different reputation value.

Note that node 202 may change the set of attributes assigned to a name prefix or assigned to a face for a particular name prefix either periodically, on-demand, or at any time. Node 202 can change the set of attributes when new attributes become available, or can change the attributes (and weight values) when node 202 changes the objective of a name prefix. An administrator may make the changes, or node 202 can make the changes automatically.

Node 202 may use the set of attributes assigned to a name prefix and/or face to determine attribute values. Node 202 may dynamically compute or update the attribute values whenever appropriate, such as when node 202 receives a Content Object (e.g., to update latency metrics), or receives an Interest (e.g., to update the number of times that an Interest is received). As another example, node 202 may update the number of successful signature verifications when it successfully verifies the signature for a Content Object. Node 202 may update attribute values for other attributes when appropriate.

Node 202 may compute the values of the attributes locally based on historical information, such as past traffic data over a period of time (e.g., past 5 minutes, past 20 days, or past one year). Node 202 may analyze historical data and quantify attribute values using the performance of the node for various different namespaces. For example, node 202 may collect and maintain logs and metrics data for a face (e.g., face 216) that node 202 has forwarded Interests to over a period of time for a namespace "/bbc," and may compute an attribute value from the data.

Each node may normalize its attribute values independent of other nodes, depending on their own local criteria. For example, node 202 may normalize attribute values based on the highest attribute expected value (e.g., the value encountered). Node 202 may normalize attribute values so that higher scores are better, while other nodes may normalize their attributes so that lower scores are better. A node may normalize attribute values such that it will compute a reputation value between any set of values (e.g., in the range [0,1]).

Node 202 may also assign a weight value to each attribute independent of how other nodes assign their weights. Node 202 may assign weight values for each attribute on a "per name-prefix," "per face," or "per name-prefix, per face" basis. That is, node 202 can assign a set of weight values to attributes for a name prefix. It can also assign another set of weight values to attributes for a face. Node 202 can also assign yet another set of weight values to a face for a particular name prefix. Alternatively, node 202 may use the same set of weight values for all namespaces and faces at a node.

Node 202 may also assign weight values at different hierarchical levels of a namespace. For example, node 202 may associate the name prefix "/cnn" with one set of weight values, and node 202 may associate the name prefix "/cnn/headlines" with another set of weight values.

Node 202 may set weight values based on criteria determined from available local resources, policy requirements, and/or any other constraints. Node 202 can evaluate the criteria and constraints to automatically (e.g., without human intervention) set or update attributes and weight values that satisfy the criteria and constraints. Node 202 may reassign new weight values according to the importance of attributes, and compute reputation values according to the new weight values. For example, if response time is important, node 202 may increase the weight value of the latency attribute, and compute new reputation values. As another example, node 202 may adjust weight values to maximize the use of available resources and avoid underutilization of resources, while staying within maximum usage thresholds. Node 202 can dynamically update attribute values and update the weight values during the same process.

Node 202 can examine historical logs and metrics data to determine the optimal weight values that can make optimal use of resources (e.g., bandwidth and available cache) at different points in time. For example, over a period of time, node 202 may determine that an attribute, such as available bandwidth, is not critical for namespace "/bbc/headlines." Node 202 may then reduce the weight value of the available bandwidth attribute for namespace "/bbc/headlines." If bandwidth is important between 5 PM and 7 PM, node 202 can increase the weight value for available bandwidth during those hours. Note that node 202 can determine whether bandwidth is more critical during certain hours by examining historical information detailing how traffic flows through the node's faces over different periods of time.

As another example, two Internet service providers (ISPs) may have a contract or tie up limiting the number of Interest messages between the peak hours of 5 PM and 7 PM to x Interests. Node 202 may dynamically adjust weight values during the peak hours of 5 PM to 7 PM to limit the number of Interest messages and re-adjust the weight values back to their original values after 7 PM.

Node 202 can set the weight values to achieve an objective of a namespace. This allows a node to forward Interests or cache Content Objects based on the objectives or goals associated with the namespace. For example, if routing policy is unimportant, node 202 may set $w_3=0$ where $w_3$ is the weight value for a routing policy attribute. Routing policies include, for example, restrictions on routing between nodes during certain time periods or restrictions on traffic load or types of traffic to some portions of the network. As another example, low latency is important for a good viewing experience with streaming video. Therefore, node 202 may set $w_1=100$ where $w_1$ is the weight value for a latency attribute. If security is paramount, such as when accessing a bank account online, then node 202 may set $w_2=100$ where $w_2$ is the weight value for a signature verification attribute.

As another example, high bandwidth and low latency can be important factors for a namespace associated with streaming video (e.g., "/netflix/video"). In contrast to other namespaces (e.g., "/citibank/savings"), the likelihood that a Content Object signature will verify successfully is not as important for streaming video. Thus, for the namespace "/netflix/video," node 202 can increase the weight values for latency and bandwidth attributes, and decrease the weight values for signature verification attributes. As another example, "/cnn/videos" name prefix may involve different constraints than "/cnn/headlines" name prefix, and node 202 may also adjust the weight values to emphasize low latency and high bandwidth for "/cnn/videos."

For the name prefix "/citibank/savings," node 202 may reduce the weight values for latency and bandwidth attributes, and increase the weight values for the signature verification attribute. This places an emphasis on security, since there is a higher likelihood that received Content Objects will have digital signatures that verify successfully.

The nodes may determine and set the weight values locally. In some embodiments, an administrator may establish the value of the weights. The administrator can initially configure the weight values and then node 202 can dynamically update the weight values to ensure the local resources are not over utilized or underutilized. The administrator and/or node 202 can change the weight values as their needs change, and certain attributes become less important while other attributes become more important. In some embodiments, an organization may manage a sector of nodes, and set the weight values for the nodes with a globally distributed protocol.

Node 202 can compute the reputation value for a name prefix and/or face based on the attribute values and weight values. In some embodiments, node 202 may compute reputation values for all forwarding rules in the local FIB. Node 202 may compute and maintain a reputation value for a name prefix (e.g., "per name-prefix") or for a face with a particular name prefix (e.g., "per name-prefix, per-face"). After computing the reputation values, node 202 can use the reputation values to make forwarding decisions. In some embodiments, node 202 may compute reputation values for faces that are candidates for forwarding an Interest when node 202 receives the Interest. Node 202 may update the computation values each time node 202 receives an Interest or Content Object. Node 202 may also compute reputation values before deciding to cache a Content Object in its Content Store and/or before determining which cached Content Object from its Content Store it can return in response to satisfy an Interest.

Reputation values are dynamic, and can change over time. For example, at 12:00 PM, face 214 may have a 50% reputation value, face 216 may have 60% reputation value, and face 218 may have 80% reputation value. Node 202 may forward an Interest via face 218 because face 218 has the highest reputation value of 80%. However, 10 minutes later, the network load distribution may change and network latency for the various faces also changes. An increased load at a face may also increase the latency of the face, thereby reducing its reputation value. Face 214 may change from the previous 50% reputation value to 80% reputation value, and face 218 may change from the previous 80% reputation value to 60% reputation value. Node 202 can shift the forwarding of Interests from face 218 to face 214 in response to the changing reputation values and changing network conditions.

Node 202 can also compute reputation values in non-real-time. For example, node 202 may cache some or all received Content Objects, and can periodically run a program through the elements in the cache to re-compute their reputation values. Node 202 can determine which Content Objects need to be evicted based on their reputation score. Node 202 can then store the updated reputation values for a name-prefix associated with a Content Object or a name-prefix-face combination associated with a Content Object (e.g., the reputation value is particular to the name prefix and face from which the Content Object was received).

In some embodiments, node 202 may also normalize the reputation value. For example, the normalized value can be in the range [0,1], or in the range [0,100]. The reputation value improves as the value of the reputation value increases, with the highest reputation value being the optimal score.

Figure 3:
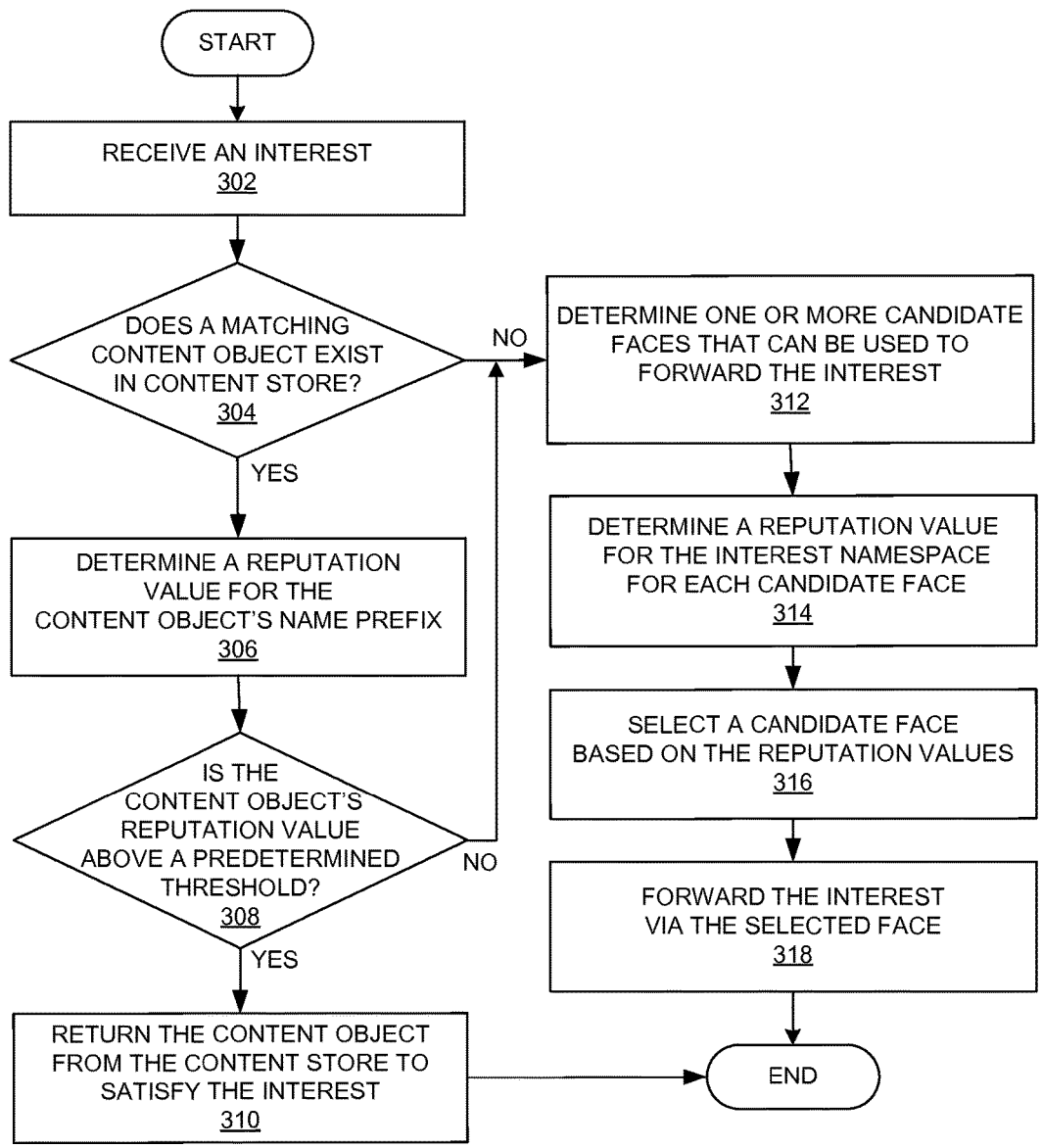
FIG. 3 presents a flow chart illustrating an overview of an exemplary process for computing a reputation value, in accordance with an embodiment of the present invention.

FIG. 3 and the associated description below present an introductory overview, and each CCN node may perform the individual operations of FIG. 3 at different times when executing operations of FIG. 4-FIG. 6.

Processing an Interest Using Attribute Values

FIG. 3 presents a flow chart illustrating an exemplary process for returning a Content Object in response to receiving an Interest, in accordance with an embodiment of the present invention. When a CCN node receives an Interest, the node may return a Content Object from its Content Store or may forward the Interest to one or more faces. If the node forwards the Interest, the node may then receive one or more Content Objects from one or more faces, and returns a Content Object via the face from which the node had received the Interest.

The node may initially receive an Interest via a face to a neighbor (operation 302). The node may determine whether there is an existing Content Object cached in the Content Store that can satisfy the Interest (e.g., a Content Object with a matching name prefix) (operation 304). If there is such a cached Content Object, then the node may determine a reputation value for the Content Object's name prefix (operation 306). In some embodiments, the node can store reputation information along with that Content Object in the Content Store. This reputation information may include a reputation value, and may include the attribute values and weights that were used to compute the reputation value. Hence, while determining the reputation value, the node can retrieve the reputation value it stored in association with the Content Object, or it can compute a new reputation value using the attributes and/or weights stored in the reputation information. For example, the node can use weights associated with a given objective (e.g., security) and the stored attribute values to compute the reputation value for the given objective. Alternatively, the node can compute the reputation value using some weights from the Content Object's reputation information and using other weights that are customized for the desired objective. As another example, the node can compute an updated attribute value for the Content Object by replacing some of the stored attribute values with more recent attribute values associated with the Content Object's name or name prefix.

The node may determine whether the cached Content Object's name prefix is associated with a reputation value above a predetermined threshold (operation 308). If the reputation value of the cached Content Object is above the predetermined threshold, the node may return the Content Object to the requesting node (operation 310). In some embodiments, if multiple Content Objects from the Content Store can satisfy the Interest, the node can return the Content Object with highest reputation. The node can also update attribute values, weight values, and reputation values at this time.

If the existing Content Object's name prefix is associated with a reputation below the predetermined threshold (operation 308), or if the node is not caching a matching Content Object (operation 304), the node may determine one or more faces that the node can use to forward the Interest (operation 312). Since the Content Store does not cache a Content Object with a reputation value that meets the requisite threshold, the node may forward the Interest to one of its neighboring nodes to obtain another Content Object that can satisfy the Interest. The node can look up the entries in a FIB to find forwarding rules that maps a name prefix of the Interest to one or more candidate faces.

The node can then determine a reputation value for the Interest namespace for each candidate face (operation 314). Each entry in the FIB also includes the corresponding reputation value. Alternatively, the node may update the reputation information associated with a candidate outbound face and/or the name prefix. The node may then select a candidate face based on the reputation values (operation 316). In some embodiments, the node may select a face with the highest reputation value, or multiple faces with reputation values above a predetermined threshold. The node may forward the Interest via the one or more selected faces (operation 318).

Figure 4:
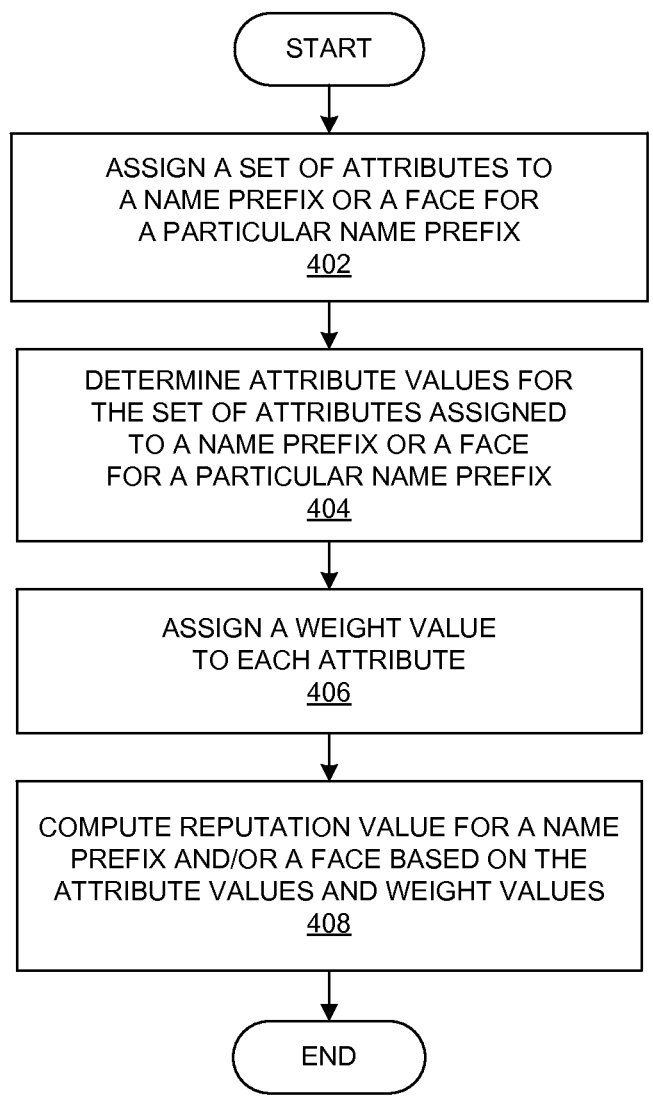
FIG. 4 presents a flow chart illustrating an exemplary process for returning a Content Object in response to receiving an Interest, in accordance with an embodiment of the present invention.

FIG. 4 presents a flow chart illustrating an overview of an exemplary process for computing a reputation value, in accordance with an embodiment of the present invention.

During operation, a node may initially assign a set of attributes to a name prefix or a face for a particular name prefix (operation 402). The node may then determine attribute values for the set of attributes assigned to a name prefix or a face for a particular name prefix (operation 404). The node can assign a weight value to each attribute (operation 406), and computes a reputation value for a name prefix and/or a face based on the attribute values and weight values (operation 408).

Figure 5:
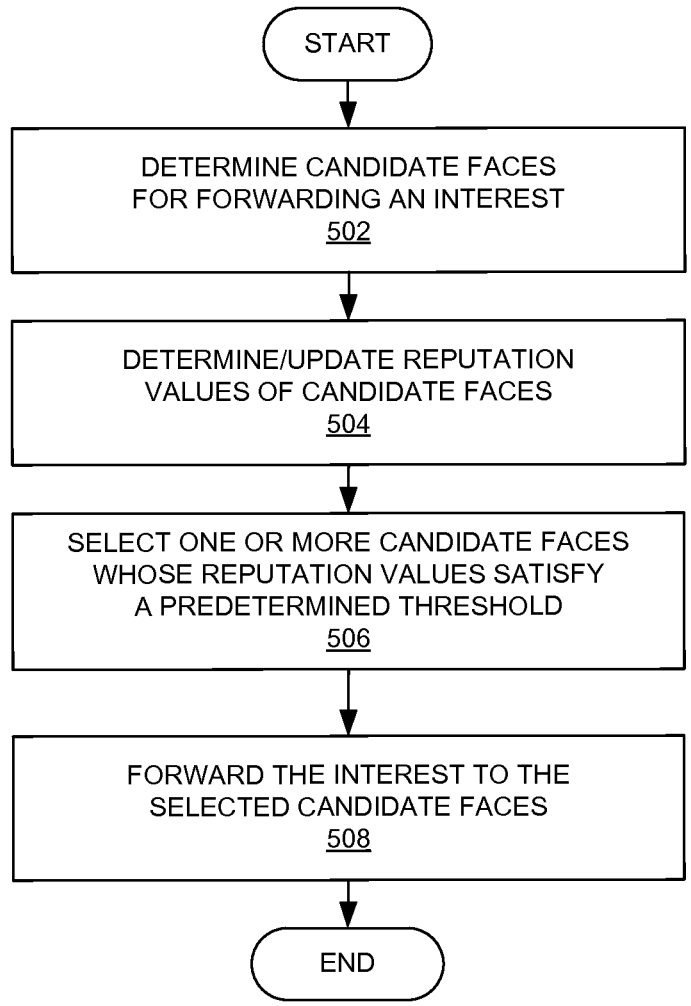
FIG. 5 presents a flow chart illustrating an exemplary process for using reputation values to determine how to forward an Interest, in accordance with an embodiment of the present invention.

FIG. 5 presents a flow chart illustrating an exemplary process for using reputation values to determine how to forward an Interest, in accordance with an embodiment of the present invention. When a node receives an Interest, the node may determine the faces that are candidates for forwarding the Interest. In some embodiments, the node can determine a candidate face by performing a minimum-prefix-matching lookup (e.g., in a FIB) to obtain a forwarding rule that maps the Interest's name prefix to one or more candidate faces.

The node determines the reputation value of the candidate faces, and chooses one or more candidate faces with reputation values that satisfy a predetermined threshold for forwarding the Interest. The node then forwards the Interest to one or more faces.

In some embodiments, a forwarder and a reputation computation module may perform the FIB lookup, determine the candidate faces, compute the reputation values for the candidate faces, and choose one or more faces for forwarding the Interest. Some embodiments may include an additional forwarding decision-making module that performs the decision-making functions for forwarding Interests. Note that there are equivalent components on each node of the CCN to perform these functions.

As depicted in FIG. 5, the node may initially determine candidate faces for forwarding the Interest (operation 502). The node can look up forwarding rules in the FIB to determine which candidate faces it can forward the Interest to. For example, the FIB may a forwarding rule that maps "/bbc" to faces A, B, and C. Based on the forwarding rule, the node can forward an Interest with prefix "/bbc" to any one or more of faces A, B, and C.

The node then determines or updates the reputation values of the candidate faces (operation 504). The node may access the FIB to add, look up, or update the reputation values of the candidate faces. The node may add a reputation value if there is no existing reputation value, and/or while adding the forwarding rule to the FIB. The node may also periodically compute and store an updated reputation value based on recent attribute values or weight values for the name prefix or interface. For example, the node may look up an existing reputation value if the corresponding attribute values and weight values have not changed, or may update the reputation value if a corresponding attribute value or weight value has changed.

Note that the node generally computes reputation values for forwarding rules in the FIB as "per name-prefix, per face," meaning that a reputation value is associated with a specific name prefix and a specific face. However, the node may compute some reputation values as "per name-prefix," so that a reputation value is only associated with the name prefix and not associated with any face. In some embodiments, the FIB may designate a reputation value as a "per name-prefix" reputation value by entering a zero in the column for the face.

In some embodiments, when processing an Interest, the node need only add (e.g., compute and write), update, or look up reputation values for faces that are listed with a name prefix of the Interest. For example, if the name prefix is "/bbc" and only the forwarding rules for face A, face B, and face C have name prefix "/bbc" in the FIB, then the node only adds, updates, or looks up reputation values for face A, face B, and face C. An example FIB may include a 65% reputation value for face C and 60% reputation value for face B and face A. Note that the node need not compute or look up reputation values for faces that are not candidate faces. The node need not compute or look up a reputation value for a face D if face D is associated with name prefix "/netflix."

In some embodiments, the node can "collapse" the reputation values so that the node computes reputation values on a per face basis. That is, a face can have a reputation value (and/or set of weight values and possibly set of attributes and/or attribute values) that is independent of the name prefix. Alternatively, the node can also associate reputation values with name prefixes with fine-grained granularity or coarse-grained granularity. The node can associate reputation values (and/or weight values and/or attributes and/or attribute values) with name prefixes at various levels of a namespace hierarchy. For example, the node can associate a reputation value (and/or weight values and/or attributes and/or attribute values) with "/bbc" and another reputation value (and/or weight values and/or attributes and/or attribute values) with "/bbc/headlines."

The node can also classify name prefixes so that the name prefixes of a particular classification can have the same reputation values (and/or weight values and/or attributes and/or attribute values). For example, name prefixes for various news websites (e.g., "/bbc/headlines" and "/cnn/headlines") may have the same set of reputation values (and/or weight values and/or attributes and/or attribute values). Also, packet traffic associated with a particular organization may be processed using the same reputation value, weight values, attributes, and/or attribute values. Providing the node with fine-grained control over reputation values, weight values and attributes improves performance and increases the probability of meeting the objectives associated with a name prefix or content category.

The node may determine which candidate faces have reputation values satisfying a predetermined threshold (operation 506). The node may choose to not forward the Interest to a candidate face that does not have a reputation value satisfying the predetermined threshold. For example, if the predetermined threshold is 60%, the node may choose to not forward the Interest to a candidate face associated with a reputation value of only 40%.

In some embodiments, the node may assign priorities to ingress faces. For example, the node may assign a higher priority to face E than face D. The node may forward via faces with higher reputation values (e.g., above a predetermined threshold) the Interests received through faces with higher priority, and it may forward via faces with lower reputation values the Interests received through faces with lower priority. The node may forward an Interest received through face E via a face with highest reputation value for a name prefix of the Interest. For example, if the node receives an Interest with namespace "/bbc/headlines" through face E, the node forwards the Interest via face C, assuming that face C has the highest reputation value (e.g., 65%) for namespace "/bbc/headlines."

The node may then forward the Interest to one or more candidate faces with reputation values satisfying a predetermined threshold (operation 508). In some embodiments, the node may determine that faces with reputation values within a predetermined range are candidates for forwarding the Interest. For example, faces with reputation values between 65% and 100% can be candidates for forwarding an Interest. The node may then forward the Interest to one of the candidate faces, a selection of the candidate faces, or all of the candidate faces. In some embodiments, the node may randomly choose to forward an Interest to one of the faces.

If the difference in reputation values between two faces is within a predetermined threshold, the node can forward an Interest to both faces. For example, if face A has a reputation value of 60%, face C has a reputation value of 65%, and the maximum allowed difference is 6%, the node can forward an Interest to both faces.

Caching a Content Object

Figure 6:
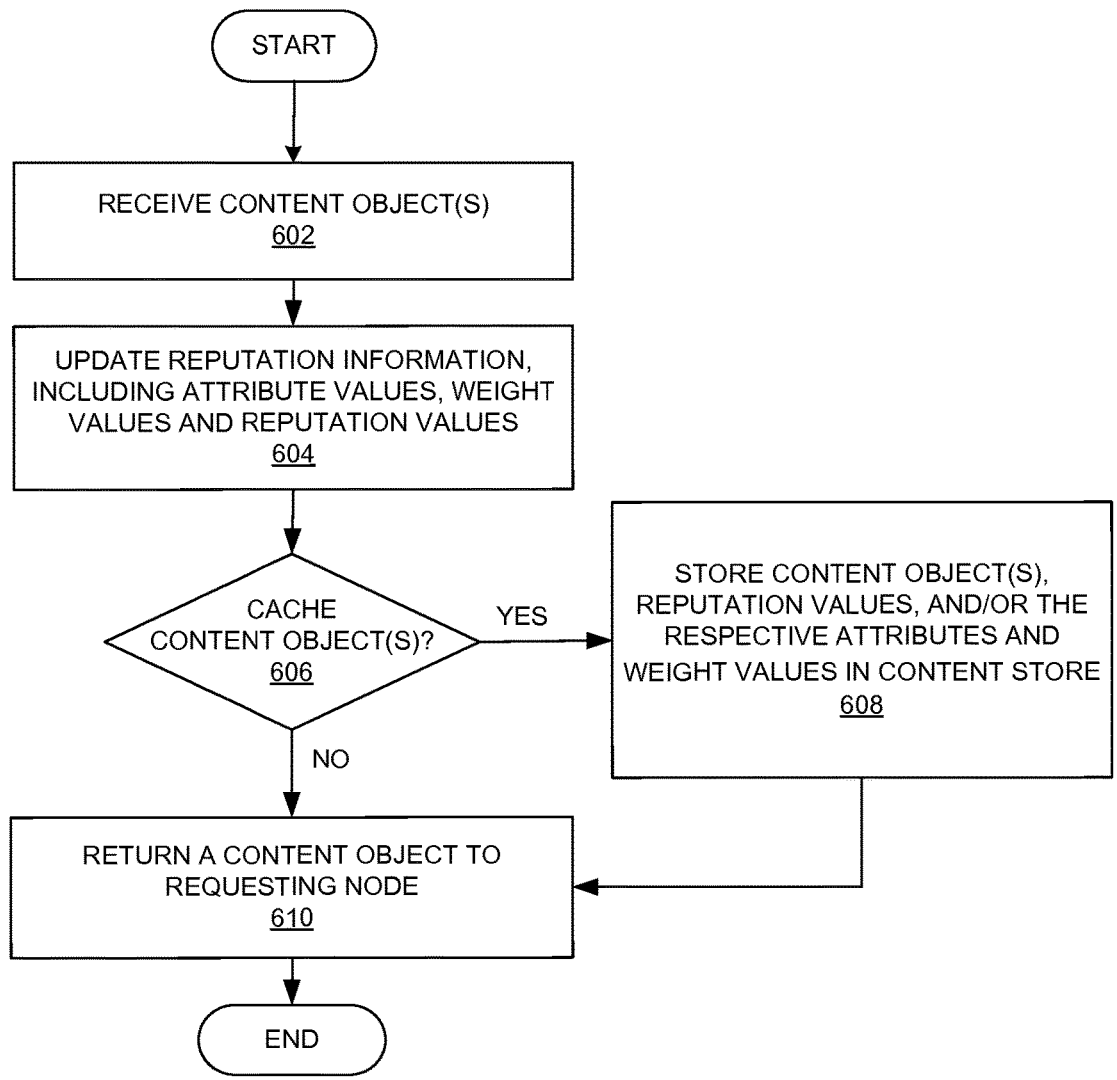
FIG. 6 presents a flow chart illustrating an exemplary process for updating attribute values, weight values, and reputation values, and using reputation values to determine whether to cache a Content Object, in accordance with an embodiment of the present invention.

FIG. 6 presents a flow chart illustrating an exemplary process for updating attribute values, weight values, and reputation values, and using reputation values to determine whether to cache a Content Object, in accordance with an embodiment of the present invention. As depicted in FIG. 6, when a node receives a Content Object satisfying an Interest, the node may update the corresponding attribute values, weight values, and reputation values stored locally. The node decides whether to cache the Content Object by comparing the reputation value to a predetermined threshold, and may proceed with caching the Content Object if the reputation value is above (or below) a predetermined minimum (or maximum) threshold. The node then returns the Content Object via a face from which it received the Interest.

During operation the node can receive a Content Object satisfying an Interest in the PIT (operation 602). For example, the node may have sent an Interest with a name prefix "/bbc/headlines" via face A. Then, when the node receives the Content Object satisfying the Interest from face A, the node can use this Content Object to satisfy the Interest. In some embodiments, the node may receive multiple Content Objects associated with a common name or name prefix via multiple faces. If the node receives multiple Content Objects with different reputation values, the node may store each of these multiple Content Objects with their respective reputation information (e.g., reputation values and/or attribute and weight values).

The node may update reputation information, including attribute values, weight values, and reputation values, for each of one or more Content Objects (operation 604). For example, the node may update a log, which stores historical performance data, to include a latency based on the round-trip delay between when the Interest was disseminated and when a corresponding Content Object was received. The node may also compute a new average-latency attribute value (and other attribute values) based on the historical performance data. The node may also adjust the weight values to reflect new objectives. After receiving one or more Content Objects and updating the attribute and/or weight values, the node may use the updated attribute data and/or weight values to update reputation information for the faces (or for the name or name prefix of the Content Objects received via the faces) from which the one or more Content Objects were received. Note that the node can use any customized combination of attributes and attribute and weight values to compute the reputation value. In some embodiments, the node can update the attribute values, weight values, and reputation values at any time, including when the node receives an Interest, when the node receives or recomputes new weight values, or periodically during a scheduled automated task.

In some embodiments, the node may periodically sample performance data from a subset of Interests and/or Content Objects received via a face, or for a certain name prefix to maintain efficiency. The node may sample and log (e.g., store) response times for only a select portion of the Interests and Content Objects that it receives to mitigate any performance impact due to the overhead of maintaining historical performance data and computing up-to-date performance attributes.

The node may decide whether to cache a Content Object based on corresponding reputation information (operation 606). The node may cache a Content Object if an associated reputation value is above (or below) a predetermined minimum (or maximum) threshold. The node may determine whether to cache a particular Content Object based on the reputation value of the face (or the name or name prefix of a Content Object received via the face) that the node receives the Content Object from. In some embodiments, the node may also determine whether to cache a particular Content Object based on a reputation value associated with a name prefix for the Content Object itself, independent of any particular face. This reputation value may be, for example, an aggregate of reputation values for multiple faces from which the node received the Content Object. The node may store the Content Object in a Content Store, and may also store the Content Object's reputation information, including the reputation value and/or the attribute and weight values used to compute the reputation value (operation 608).

The node may then return the Content Object via the face through which it received the Interest (operation 610). If multiple PIT entries exist for the Content Object's name prefix, the node may return the Content Object via multiple faces.

In some embodiments, the node can adjust weight values for a name prefix to dynamically adjust how the node determines whether to cache a Content Object for this prefix. These weight values can be associated with the cache-decision process, and are different than the weight values used for determining how to forward an Interest Note that the cache-related reputation values can be computed so that a higher (or lower) reputation value for a name prefix causes the node to cache Content Objects associated with the name prefix. For example, if latency is a deciding factor for caching content, the node can assign a higher (or lower) weight value to the latency attribute. Also, as the latency increases for a name prefix, the node can normalize the corresponding latency attribute value to increase (or decrease) reputation value. The node may then cache Content Objects whose name prefix has a reputation score that is higher (or lower) than a predetermined minimum (or maximum) value.

The node may also use a number of requests received for the name prefix of a Content Object to determine whether to cache the Content Object. For example, if there are more Interests received for "/bbc/headlines" then "/cnn/headlines," the node can assign a higher weight value to an "Interest-frequency" or "Interest-count" attribute (and/or for other related attributes) to cache Content Objects for name prefixes for which Interests are received often, and/or in large quantities. This causes the node to cache Content Objects for the name prefix "/bbc/headlines" more than other name prefixes for which Interests arrive less often. This improves the response time when the node receives "/bbc/headlines" in the future.

As another example, the node and/or an administrator may adjust a weight value for a "verification-success" attribute (and/or for other related attributes) to emphasize the importance of signature verification when caching Content Objects. If the node receives a particular Content Object from a face that has a low success rate for signature verification (e.g., only successfully verifies 20% of the signatures), the node may not cache the Content Object after determining that the reputation score for the face is below the minimum score required for caching the Content Object. However, the node may choose to cache a Content Object received from a face that has 80% signature verification successful rate.

The node can also evict Content Objects from the Content Store based on the reputation value associated with each Content Object or associated name-prefix. For example, the node can re-compute a reputation value for a cached Content Object based on recent attribute values for the face from which the Content Object was received (e.g., using attribute values computed after the Content Object was cached). However, if the new reputation value is below a predetermined minimum value (e.g., due to a reduced verification-success attribute for the face), the node can remove the Content Object from the Content Store.

As another example, the node may first cache a Content Object via a face with a reputation score that is slightly above the minimum threshold value. However, if the node receives a Content Object with the same name via a face with a higher reputation value, the node may evict the cached copy of the Content Object, and may store the recent Content Object received via the face with a higher reputation value. Note that the eviction operation does not interfere with the runtime forwarding of Interests or Content Objects.

In some embodiment, the node may have forwarded an Interest via multiple faces to solicit multiple candidate Content Objects for the Interest. Then, during operation 602, the node may receive multiple Content Objects via multiple faces, such that any of these Content Objects can be used to satisfy an Interest. The node may wait for a predetermined amount of time (e.g., an Interest's timeout period) to receive and cache multiple Content Objects. The node may choose to cache and/or return a Content Object received through a face with the highest reputation value. For example, the node may forward an Interest via face B when the reputation value of face B is 60%, and forward the same Interest via face C when the reputation value of face C is 65%. When the node receives a Content Object through face B, the reputation value of face B may have dropped to 20%, but the reputation value of face C may remain at 65%. Since the reputation value of face B has dropped to 20%, it is now below a predetermined threshold of 50% reputation value. The node may choose to not return the Content Object received through face B, but instead wait a predetermined amount of time to receive a Content Object via face C. If the node receives the Content Object via face C, the node can return this Content Object to satisfy the Interest. If the Interest times out, the node may return the Content Object from face B to satisfy the Interest as there are no other options.

Exemplary FIB with Reputation values

FIG. 7 presents a block diagram illustrating an exemplary FIB 700 with reputation values, according to an embodiment. Column 702 stores entries for one or more name prefixes (e.g., a content name, and/or name prefix or path), and column 704 stores an associated reputation value for a given namespace. Column 706 stores an associated face for the namespace.

As depicted in FIG. 7, there are five example forwarding rule entries in FIB 700. For example, the namespace "/bbc" is mapped to faces A, B, and C. The name prefix "/bbc" at face C has a reputation value of 65%, while the name prefix "/bbc" at either face A or face B has a reputation value of 60%. The namespace "/cnn" is not mapped to any face. The FIB entry for the name prefix "/cnn" has number zero in face column 706 to indicate that there is no face for the namespace. However, the node can compute a reputation value for the name prefix "/cnn" without regard to a face. Hence, reputation value column 704 for the "/cnn" entry can specify a reputation value of 60%. The FIB entry for name prefix "/netflix" specifies that name prefix "/netflix" is mapped to a face D, and that "/netflix" at face D has a reputation value of 50%.

FIG. 8 presents a block diagram illustrating an exemplary Content Store 800, according to an embodiment. Column 802 stores the namespace of a Content Object. Column 804 stores a reputation value of the Content Object. Some embodiments may also include a column 806 storing an identifier indicating a face that the Content Object was received through.

As depicted in FIG. 8, there are three Content Objects in Content Store 800. A node may compute and associate a reputation value with each object in Content Store 800. For example, Content Store 800 may associate a reputation value of 60% for a Content Object with a name prefix "/bbc/headlines" received via a face B, and may associate a reputation value of 50% for a Content Object with a name prefix "/Netflix/video" received via a face D.

The Content Store may also include a number zero in "face" column 806 to indicate that the reputation value is an aggregated value. For example, the Content Store may associate a reputation value of 60% with a Content Object with name prefix "/cnn/headlines" whose reputation score was computed based on historical data from multiple faces (as indicated by a number zero for the face identifier).

Figure 9:
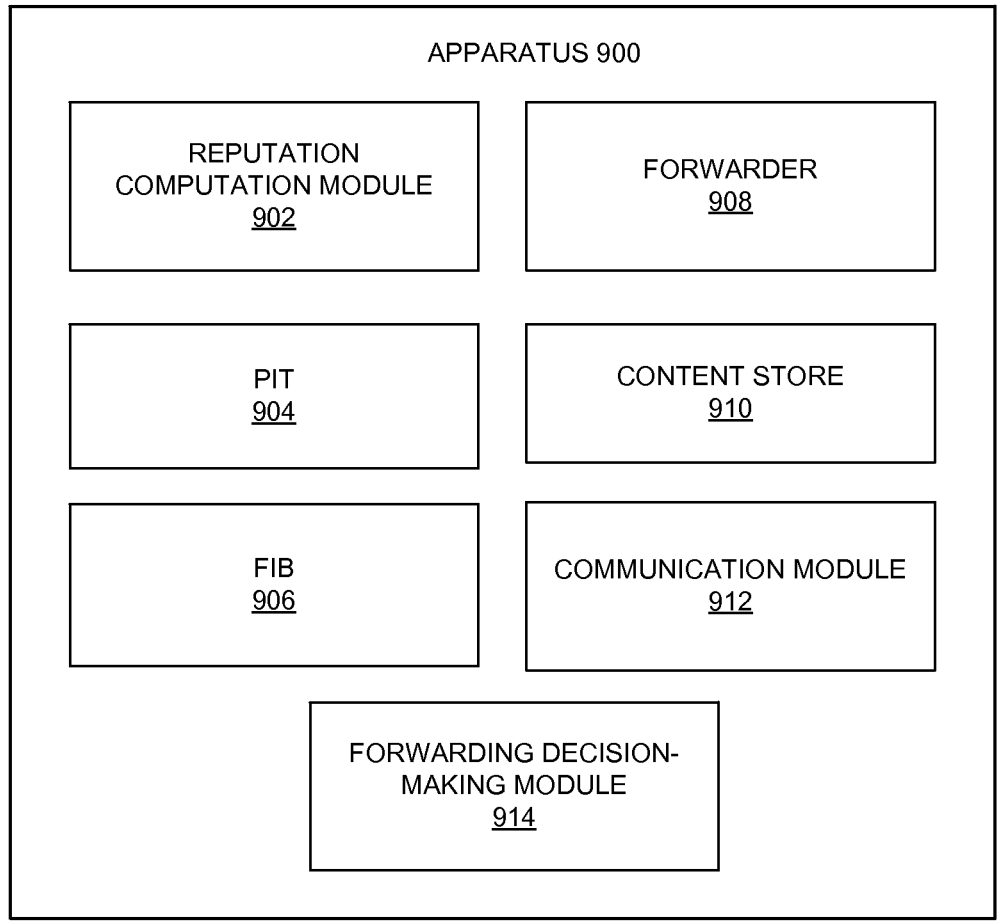
FIG. 9 illustrates an exemplary apparatus that facilitates strategic forwarding and caching using reputation values, in accordance with an embodiment.

FIG. 9 illustrates an exemplary apparatus 900 that facilitates strategic forwarding and caching using reputation values, in accordance with an embodiment. Apparatus 900 can comprise a plurality of modules which may communicate with one another via a wired or wireless communication channel. Apparatus 900 may be realized using one or more integrated circuits, and may include fewer or more modules than those shown in FIG. 9. Further, apparatus 900 may be integrated in a computer system, or realized as a separate device which is capable of communicating with other computer systems and/or devices. Specifically, apparatus 900 can comprise a reputation computation module 902, a PIT 904, a FIB 906, a forwarder 908, a Content Store 910, a communication module 912, and a forwarding decision-making module 914.

Reputation computation module 902 can compute and update reputation values either periodically or on-demand (in near real-time). A node can maintain PIT 904 to keep track of pending Interests, and can update PIT 904 when it receives a new Interest or when an old Interest is satisfied or times out. PIT 904 stores entries for Interests that are to be matched against incoming Content Objects, and each entry is removed when a match is made, or when an Interest times out. FIB 906 is a forwarding table that contains information for the node to determine to which neighbor node or nodes an Interest needs to be sent.

Forwarder 908 forwards Interests and/or packets on the network. Forwarder 908 performs functions that include deciding to which faces it will forward an Interest based on reputation values, and updating reputation values and attribute values when a node receives an Interest or a Content Object. Note that in some embodiments, apparatus 900 may include additional modules that perform some of the individual functions of forwarder 908, and embodiments of the present invention are not limited to the modules described herein.

Content Store 910 can store Content Objects that apparatus 900 has received via one or more faces. In some embodiments, communication module 912 can receive a packet. Apparatus 900 may include forwarding decision-making module 914, which performs functions including deciding which faces apparatus 900 can use to forward an Interest based on a reputation value. Forwarding decision-making module 914 can also decide whether to cache Content Objects based on an associated reputation value.

Computer System

Figure 10:
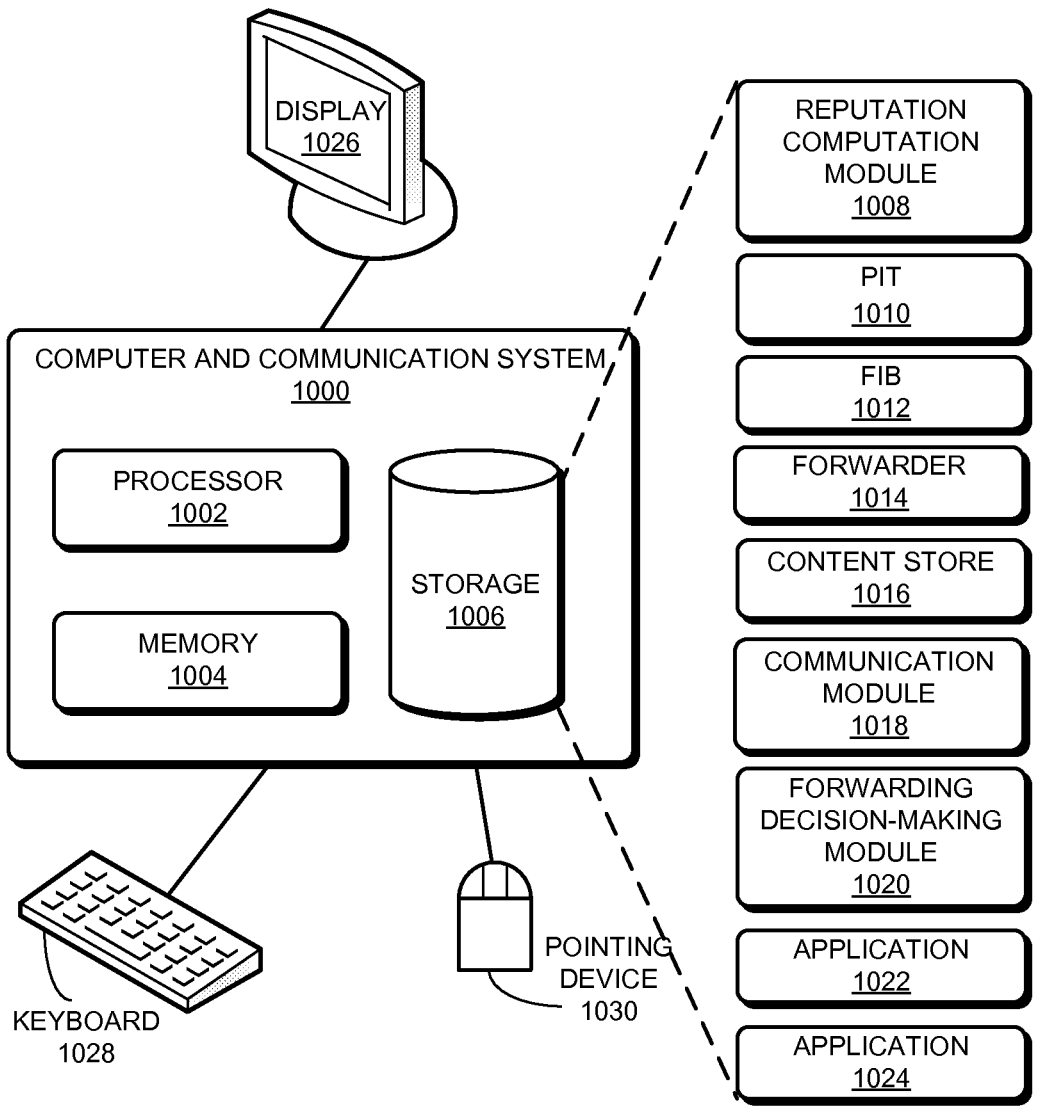
FIG. 10 presents an exemplary computer system for using reputation values to facilitate strategic forwarding and caching, in accordance with an embodiment of the present invention.

FIG. 10 presents an exemplary computer system for using reputation values to facilitate strategic forwarding and caching, in accordance with an embodiment of the present invention. As described with respect to FIG. 1, CCN devices can be any type of a computing device, including mobile computing devices, such as a laptop computer, a tablet or slate computer, a smartphone, or a personal digital assistant (PDA), or a stationary computing device, such as a desktop computer, an Internet server, or a home media server. FIG. 10 illustrates an example of such a computing device.

In FIG. 10, a computer and communication system 1000 includes a processor 1002, a memory 1004, and a storage device 1006. Storage device 1006 stores programs to be executed by processor 1002. Specifically, storage device 1006 stores a reputation computation module 1008, a PIT 1010, a FIB 1012, a forwarder 1014, a Content Store 1016, a communication module 1018, and a forwarding decision-making module 1020, as well as other applications, such as applications 1022 and 1024.

During operation, reputation computation module 1008, PIT 1010, FIB 1012, forwarder 1014, a module to facilitate caching in Content Store 1016, and forwarding decision-making module 1020 are loaded from storage device 1006 into memory 1004 and then executed by processor 1002. While executing the program, processor 1002 performs the aforementioned functions. Computer and communication system 1000 is coupled to an optional display 1026, keyboard 1028, and pointing device 1030.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executable method for reputation-based forwarding and caching, the method comprising:
   determining, by a computing device, one or more candidate outbound faces for forwarding an interest by looking up the interest's name or name prefix in a forwarding information base (FIB), wherein a respective FIB entry maps a name prefix to a forwarding rule that includes a corresponding outbound face for the name prefix, and wherein the name or name prefix is a hierarchically structured variable-length identifier (HSVLI);
   determining a reputation value for each of the candidate outbound faces based on reputation information stored in association with the interest's name or name prefix;
   selecting a candidate outbound face with a reputation value exceeding a first predetermined threshold;
   forwarding the interest via the selected candidate outbound face;
   receiving, via the selected candidate outbound face, a content object associated with the name or name prefix;
   determining the reputation value for the selected candidate outbound face through which the content object is received; and
   responsive to determining that the reputation value for the selected candidate outbound face through which the content object is received exceeds a second predetermined threshold, caching the content object in a content store that stores cached content objects.

2. The method of claim 1, wherein the reputation information includes at least one of:
   a reputation value;
   a set of attribute values; and
   a set of attribute weights.

3. The method of claim 1, wherein determining the reputation value involves performing one or more of:
   obtaining the reputation value from the reputation information;
   computing the reputation value based on one or more of the attribute values and attribute weights from the reputation information; and
   computing the reputation value from one or more of the attribute values of the reputation information and custom attribute weights for the one or more attribute values.

4. The method of claim 1, further comprising:
   receiving, via one or more faces, one or more content objects associated with a common name or name prefix;
   determining, for each of the one or more content objects, reputation information for a respective face, or for the name or name prefix of the content object received via the respective face;
   determining whether to cache a respective content object based on the corresponding reputation information; and
   responsive to determining to cache the respective content object, caching the content object with the corresponding reputation information in a content store.

5. The method of claim 1, further comprising:
   forwarding the interest via multiple outbound faces;
   waiting for a predetermined period of time to receive one or more content objects via any of the multiple outbound faces, wherein each of the one or more content objects is associated with reputation information;
   selecting, from the one or more content objects, a second content object with a highest reputation value;
   responsive to determining that the second content object's reputation value is higher than a reputation value of a cached content object:
   caching the second content object; and
   returning the second content object via a face from which the interest was received.

6. The method of claim 1, further comprising:
   receiving a second interest from a first ingress face;
   performing a lookup in a content store to retrieve a cached content object that satisfies the second interest, wherein the content store stores the cached content object along with corresponding reputation information; and
   responsive to determining, from the cached content object's reputation information, that the cached content object's reputation value exceeds a predetermined threshold, returning the cached content object to the requesting node.

7. The method of claim 1, further comprising:
   assigning an attribute value to one or more attributes for a second candidate outbound face;
   assigning a weight value to each of the one or more attributes;
   computing a reputation value for the second candidate outbound face for the name prefix based on the assigned attribute value and the assigned weight value; and
   storing reputation information, which includes the computed reputation value, attribute values, and weight values, in association with the second candidate outbound face and/or the name prefix.

8. The method of claim 1, further comprising:
   computing one or more attribute values for a respective candidate outbound face based on the name prefix;
   normalizing a respective attribute value based on a highest expected value for the attribute;

determining a weight for the respective attribute value; and computing the reputation value for the outbound face and name prefix as a weighted sum of the one or more attribute values.

9. The method of claim 1, further comprising:
receiving a first interest from a first ingress face, and a second interest from a second ingress face;
determining that the second ingress face is associated with a higher priority than the first ingress face;
forwarding the first interest via a first egress face; and
forwarding the second interest via a second egress face with a reputation value that is higher than that of the first egress face.

10. The method of claim 1, further comprising:
determining, for a name prefix classification, a set of name prefixes associated with the name prefix classification;
generating reputation information for the name prefix classification based on profiling information associated with the set of name prefixes; and
associating the reputation information with the name prefix classification.

11. The method of claim 1, wherein determining the reputation value for each of the candidate outbound faces further comprises determining a success rate for verifying signatures of content objects arriving via a respective candidate outbound face.

12. A non-transitory computer-readable storage medium storing instructions which when executed by a computer cause the computer to perform a method, the method comprising:
determining one or more candidate outbound faces for forwarding an interest by looking up the interest's name or name prefix in a forwarding information base (FIB), wherein a respective FIB entry maps a name prefix to a forwarding rule that includes a corresponding outbound face for the name prefix, and wherein the name or name prefix is a hierarchically structured variable-length identifier (HSVLI;
determining a reputation value for each of the candidate outbound faces based on reputation information stored in association with the interest's name or name prefix;
selecting a candidate outbound face with a reputation value exceeding a first predetermined threshold;
forwarding the interest via the selected candidate outbound face;
receiving, via the selected candidate outbound face, a content object associated with the name or name prefix;
determining the reputation value for the selected candidate outbound face through which the content object is received; and
responsive to determining that the reputation value for the selected candidate outbound face through which the content object is received exceeds a second predetermined threshold, caching the content object in a content store that stores cached content objects.

13. The storage medium of claim 12, wherein the method further comprises:
receiving, via one or more faces, one or more content objects associated with a name or name prefix;
determining, for each of the one or more content objects, reputation information for a respective face, or for the name or name prefix of the content object received via the respective face;
determining whether to cache a respective content object based on the corresponding reputation information; and responsive to determining to cache the respective content object, caching the content object with the corresponding reputation information in a content store.

14. The storage medium of claim 12, wherein the method further comprises:
forwarding the interest via multiple outbound faces;
waiting for a predetermined period of time to receive one or more content objects via any of the multiple outbound faces, wherein each of the one or more content objects is associated with reputation information;
selecting, from the one or more content objects, a second content object with a highest reputation value;
responsive to determining that the second content object's reputation value is higher than a reputation value of a cached content object:
caching the second content object; and
returning the second content object via a face from which the interest was received.

15. The storage medium of claim 12, wherein the method further comprises:
receiving a second interest from a first ingress face;
performing a lookup in a content store to retrieve a cached content object that satisfies the second interest, wherein the content store stores the cached content object along with corresponding reputation information; and
responsive to determining, from the cached content object's reputation information, that the cached content object's reputation value exceeds a predetermined threshold, returning the cached content object to the requesting node.

16. The storage medium of claim 12, wherein the method further comprises:
assigning an attribute value to one or more attributes for a second candidate outbound face;
assigning a weight value to each of the one or more attributes;
computing a reputation value for the second candidate outbound face for the name prefix based on the assigned attribute value and the assigned weight value; and
storing reputation information, which includes the reputation values, attribute values, and weight values, in association with the candidate outbound face and/or the name prefix.

17. The storage medium of claim 12, wherein the method further comprises:
computing one or more attribute values for a respective candidate outbound face based on the name prefix;
normalizing a respective attribute value based on a highest expected value for the attribute;
determining a weight for the respective attribute value; and
computing the reputation value for the outbound face and name prefix as a weighted sum of the one or more attribute values.

18. The storage medium of claim 12, wherein the method further comprises:
receiving a first interest from a first ingress face, and a second interest from a second ingress face;
determining that the second ingress face is associated with a higher priority than the first ingress face;
forwarding the first interest via a first egress face; and
forwarding the second interest via a second egress face with a reputation value that is higher than that of the first egress face.

19. The storage medium of claim 12, wherein the method further comprises:

determining, for a name prefix classification, a set of name prefixes associated with the name prefix classification;

generating reputation information for the name prefix classification based on profiling information associated with the set of name prefixes; and associating the reputation information with the name prefix classification.

20. A computing system comprising:
one or more processors;
a memory; and
a non-transitory computer-readable medium coupled to the one or more processors storing instructions stored that, when executed by the one or more processors, cause the computing system to perform a method comprising:

determining one or more candidate outbound faces for forwarding an interest by looking up the interest's name or name prefix in a forwarding information base (FIB), wherein a respective FIB entry maps a name prefix to a forwarding rule that includes a corresponding outbound face for the name prefix, and wherein the name or name prefix is a hierarchically structured variable-length identifier (HSVLI);

determining a reputation value for each of the candidate outbound faces based on reputation information stored in association with the interest's name or name prefix;

selecting a candidate outbound face with a reputation value exceeding a first predetermined threshold;

forwarding the interest via the selected candidate outbound face;

receiving, via the selected candidate outbound face, a content object associated with the name or name prefix;

determining the reputation value for the selected candidate outbound face through which the content object is received; and responsive to determining that the reputation value for the selected candidate outbound face through which the content object is received exceeds a second predetermined threshold, caching the content object in a content store that stores cached content objects.

21. The computing system of claim 20, wherein the method further comprises:

forwarding the interest via multiple outbound faces;

waiting for a predetermined period of time to receive one or more content objects via any of the multiple outbound faces, wherein each of the one or more content objects is associated with reputation information;

selecting, from the one or more content objects, a second content object with a highest reputation value;

responsive to determining that the second content object's reputation value is higher than a reputation value of a cached content object:

caching the second content object; and returning the second content object via a face from which the interest was received.

22. The computing system of claim 20, wherein the method further comprises:

receiving a second interest from a first ingress face;

performing a lookup in a content store to retrieve a cached content object that satisfies the second interest, wherein the content store stores the cached content object along with corresponding reputation information; and responsive to determining, from the cached content object's reputation information, that the cached content object's reputation value exceeds a predetermined threshold, returning the cached content object to the requesting node.

23. The computing system of claim 20, wherein the method further comprises:

assigning an attribute value to one or more attributes for a second candidate outbound face;

assigning a weight value to each of the one or more attributes;

computing a reputation value for the second candidate outbound face for the name prefix based on the assigned attribute value and the assigned weight value; and storing reputation information, which includes the reputation values, attribute values, and weight values, in association with the candidate outbound face and/or the name prefix.

24. The computing system of claim 20, wherein the method further comprises:

computing one or more attribute values for a respective candidate outbound face based on the name prefix;

normalizing a respective attribute value based on a highest expected value for the attribute;

determining a weight for the respective attribute value; and computing the reputation value for the outbound face and name prefix as a weighted sum of the one or more attribute values.

25. The computing system of claim 20, wherein the method further comprises:

receiving a first interest from a first ingress face, and a second interest from a second ingress face;

determining that the second ingress face is associated with a higher priority than the first ingress face;

forwarding the first interest via a first egress face; and forwarding the second interest via a second egress face with a reputation value that is higher than that of the first egress face.

26. The computing system of claim 20, wherein the method further comprises:

determining, for a name prefix classification, a set of name prefixes associated with the name prefix classification;

generating reputation information for the name prefix classification based on profiling information associated with the set of name prefixes; and associating the reputation information with the name prefix classification.

* * * * *